(12) United States Patent
Anwyl et al.

(10) Patent No.: US 8,797,948 B2
(45) Date of Patent: Aug. 5, 2014

(54) METHOD AND APPARATUS FOR CALIBRATION OF AN IMPLICIT BEAMFORMING WIRELESS SYSTEM

(75) Inventors: Gary Allen Anwyl, Palo Alto, CA (US); Thomas Edward Pare, Jr., Mountain View, CA (US); Kiran Uln, Pleasanton, CA (US)

(73) Assignee: Mediatek Inc., Hsin-Chu (TW)

( * ) Notice: Subject to any disclaimer, the term of this patent is extended or adjusted under 35 U.S.C. 154(b) by 277 days.

(21) Appl. No.: 12/692,356

(22) Filed: Jan. 22, 2010

(65) Prior Publication Data

US 2011/0182192 A1 Jul. 28, 2011

(51) Int. Cl.
*H04W 4/00* (2009.01)
(52) U.S. Cl.
USPC ........................................ 370/328
(58) Field of Classification Search
USPC .................... 375/262, 267; 455/101; 370/328
See application file for complete search history.

(56) References Cited

U.S. PATENT DOCUMENTS

| | | | |
|---|---|---|---|
| 7,848,444 B2 * | 12/2010 | Yamaura | 375/267 |
| 2007/0249296 A1 * | 10/2007 | Howard et al. | 455/101 |
| 2007/0286303 A1 | 12/2007 | Yamaura | |
| 2008/0219373 A1 * | 9/2008 | Zhang et al. | 375/262 |

* cited by examiner

*Primary Examiner* — Mark Rinehart
*Assistant Examiner* — Gbemileke Onamuti
(74) *Attorney, Agent, or Firm* — Sawyer Law Group, P.C.

(57) ABSTRACT

A first embodiment is a method of calibrating an implicit beamforming wireless system wherein the implicit wireless system comprises a beamformer and a beamformee. The method comprises associating the beamformer with the beamformee, sending a sounding packet from the beamformer to the beamformee, receiving a sounding response at the beamformer wherein the sounding response contains explicit channel state information as estimated by beamformee, computing implicit channel state information at the beamformer based on transmissions from the beamformee, passing explicit and implicit channel state information into the beamformer, computing a set of compensation parameters and loading the set of compensation parameters into the beamformer thereby enabling the beamformer to implicitly beamform to a device that does not support explicit beamforming.

14 Claims, 4 Drawing Sheets

METHOD AND APPARATUS FOR CALIBRATION OF AN IMPLICIT BEAMFORMING WIRELESS SYSTEM

FIELD OF THE INVENTION

The present invention relates generally to wireless communication systems and more specifically to a method and apparatus for calibration of an implicit beamforming wireless communication systems.

BACKGROUND

Beamforming is a method for using wireless channel state information to transmit signals to the receiver in order to improve reception quality, and increase data throughput in a Multi-In, Multi-Out (MIMO) communication system. Implicit beamforming is a class of beamforming techniques that do not require the explicit cooperation of the receiving device to learn the channel state information. However, in order to optimize implicit beamforming, the transmit and receive paths of the beamforming device should be calibrated. Previous schemes to calibrate the transmit path of a device involve the conditioning the device to transmit a calibration signal, capturing the transmission with specialized calibrated equipment and analyzing the signal to determine the transmit compensation parameters.

Similarly, calibrating the receive path involves using specialized, calibrated equipment to generate a calibration signal, injecting it into the receive path of the device and analyzing the receive signal in the device to determine the receive compensation parameters.

Another scheme may involve the addition of hardware to the device to loop the transmit signal back to the receiver. The device would be conditioned to transmit a calibration sequence and the looped back signal would be analyzed in the receiver to determine the compensation parameters. If the calibration is stable for the lifetime of the device the calibration could be done once during its manufacture. If the calibration is not stable it is necessary to perform the calibration again when conditions change.

Accordingly, what is desired is to provide a system and method that overcomes the above issues. The present invention addresses such a need.

SUMMARY OF THE INVENTION

Varying embodiments of the present invention describe a method and apparatus for calibration of an implicit beamforming wireless communication systems. In an embodiment, an explicit beamforming system is utilized to calibrate an implicit beamforming device. The invention does not employ specialized equipment or a special test environment or additional hardware. Additionally, the calibration is fairly quick and can be performed anytime during the lifetime of the device.

A first embodiment is a method of calibrating an implicit beamforming wireless system wherein the implicit wireless system comprises a beamformer and a beamformee. The method comprises associating the beamformer with the beamformee, sending a sounding packet from the beamformer to the beamformee, receiving a sounding response at the beamformer wherein the sounding response contains explicit channel state information as estimated by beamformee, computing implicit channel state information at the beamformer based on transmissions from the beamformee, passing explicit and implicit channel state information into the beamformer, computing a set of compensation parameters and loading the set of compensation parameters into the beamformer thereby enabling the beamformer to implicitly beamform to a device that does not support explicit beamforming.

A second embodiment is a wireless communication system comprising a beamformer and a beamformee, a communication channel for communication there between wherein the beamformer and beamformee each include at least one software module capable of performing the following steps: associating the beamformer with the beamformee, sending a sounding packet from the beamformer to the beamformee, receiving a sounding response at the beamformer wherein the sounding response contains explicit channel state information as estimated by beamformee, computing implicit channel state information at the beamformer based on transmissions from the beamformee, passing explicit and implicit channel state information into the beamformer, computing a set of compensation parameters and loading the set of compensation parameters into the beamformer thereby enabling the beamformer to implicitly beamform to a device that does not support explicit beamforming.

Other aspects and advantages of the present invention will become apparent from the following detailed description, taken in conjunction with the accompanying drawings, illustrating by way of example the principles of the invention.

DETAILED DESCRIPTION OF PREFERRED EMBODIMENTS

The present invention relates generally to a method and apparatus for calibration of an implicit beamforming wireless communication systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Varying embodiments of the present invention describe a method and apparatus for calibration of an implicit beamforming wireless communication systems. In an embodiment, an explicit beamforming system is utilized to calibrate an implicit beamforming device. The invention does not employ specialized equipment or a special test environment or additional hardware. Additionally, the calibration is fairly quick and can be performed anytime during the lifetime of the device.

In implicit beamforming, the Beamformer uses transmissions received from the Beamformee to calculate the channel state information for the Beamformer's receive path. It assumes that the transmit path from the Beamformer to the Beamformee is the reciprocal of the receive path. Therefore the Beamformer can use the receive channel state information to calculate the steering matrix for the Beamformer's transmit path.

In order to guarantee that the transmit path is the reciprocal of the receive path, the Beamformer must compensate for the phase and group delay in the transmit and receive paths between its baseband and its antennas. This invention is a method for determining the phase, group delay and other compensation parameters.

Figure 1:
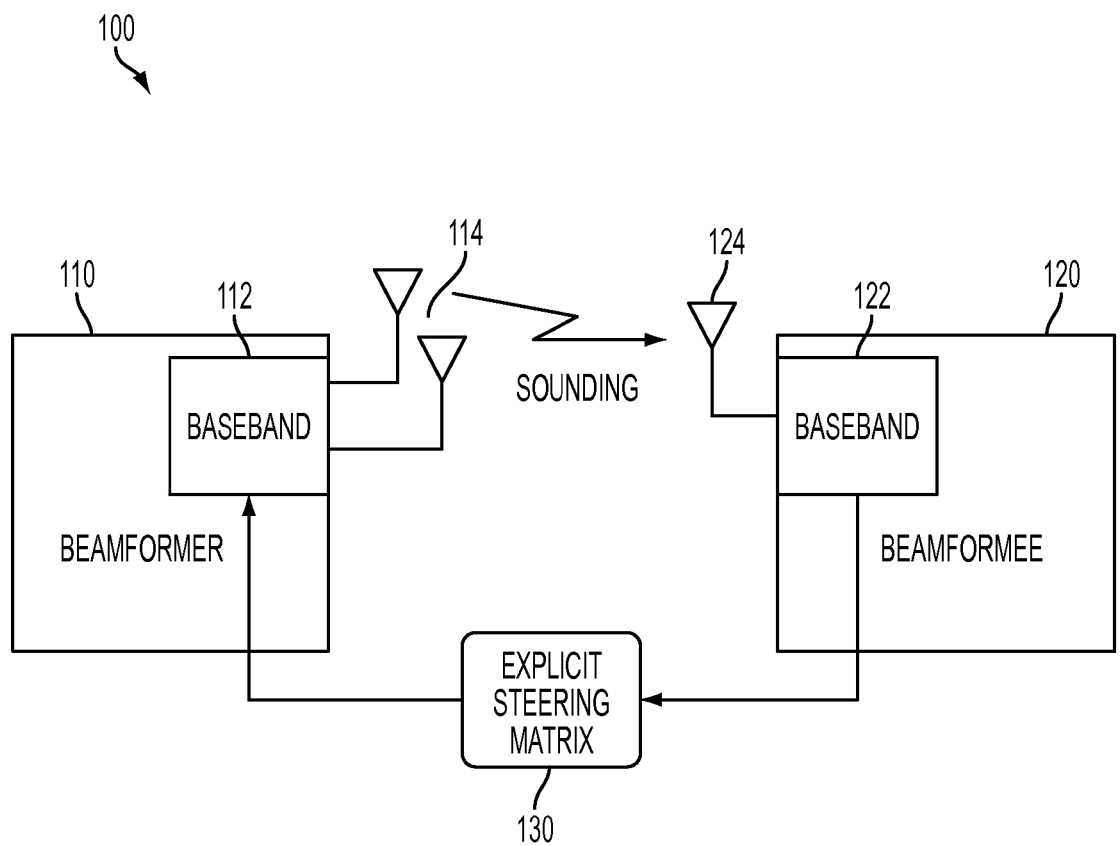
FIG. 1 shows an explicit transmit beamforming system.

There are two broad classes of beamforming systems. Explicit beamforming systems require the explicit cooperation of the receiving device to determine the beamforming matrix. Implicit beamforming systems determine the beamforming matrix without the explicit cooperation of the receiving device. FIG. 1 shows an explicit beamforming system 100. The system 100 includes a Beamformer 110 and a Beamformee 120. The Beamformer 110 includes a baseband 112 and two or more antennas 114. The Beamformee 120 also includes a baseband 122 and one or more antennas 124. The system 100 also includes and explicit steering matrix 130.

During operation, the Beamformer 110 sends a sounding packet to the Beamformee 120. The Beamformee 120 computes the explicit steering matrix 130 and sends it to the Beamformer 110 in a sounding response packet. Alternately, it can send the channel state information to the Beamformer 110 and the Beamformer 110 can compute the explicit steering matrix 130. In either case, the Beamformer 110 has an explicit steering matrix 130. Accordingly, the Beamformer 110 uses the steering matrix 130 to beamform subsequent transmissions to the Beamformee 120.

Figure 2:
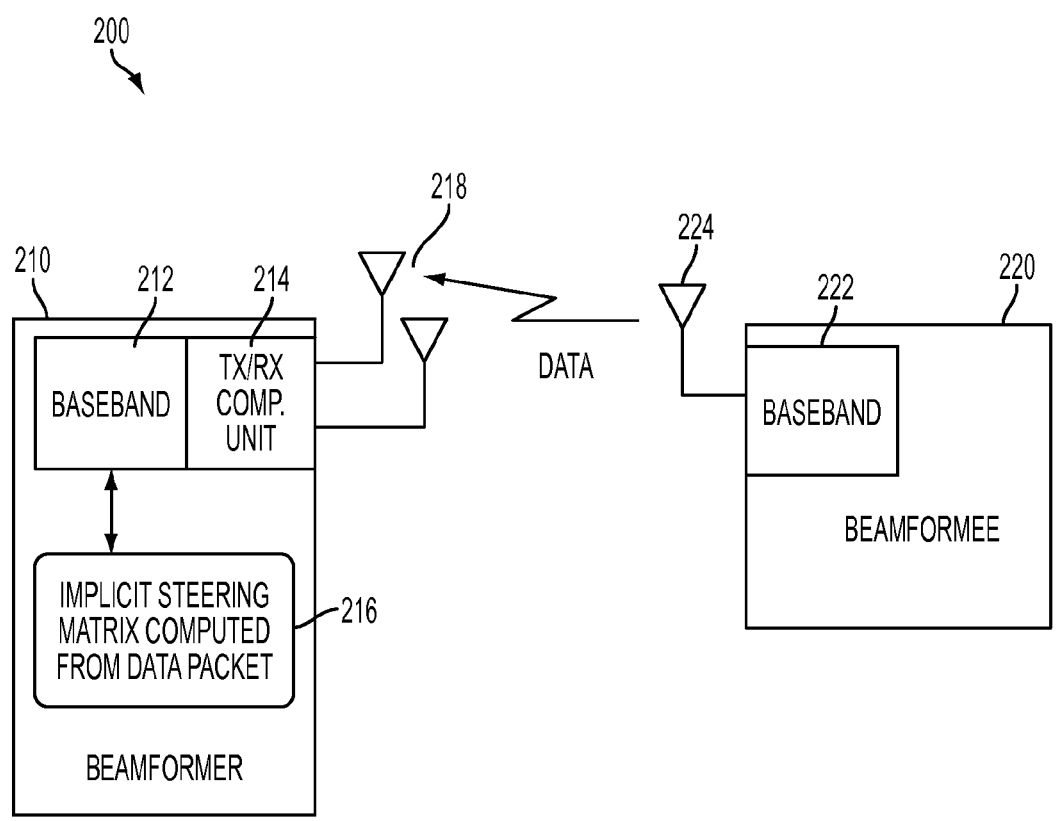
FIG. 2 shows an implicit beamforming system.

FIG. 2 below shows an implicit beamforming system 200. The system 200 includes a Beamformer 210 and a Beamformee 220. The Beamformer 210 includes a baseband 212, a transmit/receive compensation unit 214, an implicit steering matrix 216 and two or more antennas 218. The Beamformee 220 includes a baseband 222 and one or more antennas 224.

During operation, in the implicit beamforming system 200, the Beamformer 210 receives a normal data packet from the Beamformee 220 and uses it to compute the implicit steering matrix 216 based on the channel state information for the receive channel. In order for the implicit steering matrix to be valid for use in the transmit path, the transmit path must be the reciprocal of the receive path. Accordingly, the Beamformer 210 has a compensation unit 214 in the transmit and receive paths between the baseband 212 and the antenna 218 to insure that the transmit and receive paths are reciprocal.

Figure 3:
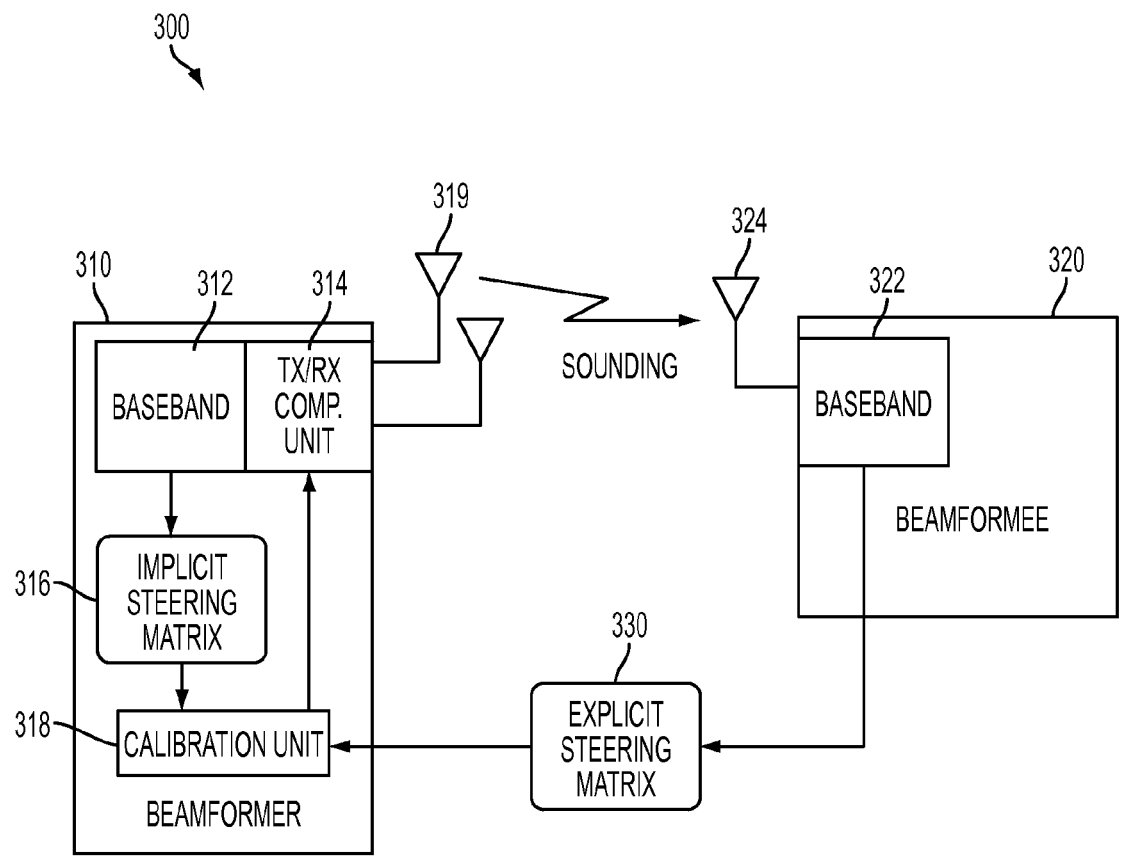
FIG. 3 shows an implicit transmit beamforming calibration system in accordance with an embodiment of the present invention.

FIG. 3 shows an implicit transmit beamforming calibration system 300 in accordance with an embodiment of the present invention. The system 300 includes a Beamformer 310 and a Beamformee 320. The Beamformer 310 includes a baseband 312, a transmit/receive compensation unit 314, an implicit steering matrix 316, a calibration unit 318 and two or more antennas 319. The Beamformee 320 includes a baseband 322 and one or more antennas 324. The system 300 also includes an explicit steering matrix 330.

A calibration technique in accordance with an embodiment will now be described. It should be noted that initially, the transmit and receive paths of the Beamformee 320 are not calibrated. Accordingly, once calibration is initiated, the Beamformer 310 associates with a device (Beamformee 320) that supports explicit beamforming. The Beamformer 310 then sends a sounding packet to the Beamformee 320 and receives a sounding response from the Beamformee 320. The sounding response contains an explicit steering matrix 330. Simultaneously, an implicit steering matrix 316 is computed based on the sounding response packet. The implicit steering matrix 316 will be similar to the explicit steering matrix 330, but there will be differences introduced by the uncalibrated transmit and receive paths in the Beamformer 310.

The explicit and implicit steering matrices 330, 316 are then passed to the calibration unit 318. The calibration unit 318, which may reside in the chip or in the software layer, analyzes the explicit and implicit steering matrices 330, 316 and computes a set of transmit and receive compensation parameters that when corrected for will match the implicit steering matrix 316 with the explicit steering matrix 330. The transmit and receive compensation parameters are then loaded into transmit and receive compensation unit 314. Once the compensation parameters have been loaded, the device may now implicitly Beamform to devices that do not support explicit Beamforming.

Figure 4:
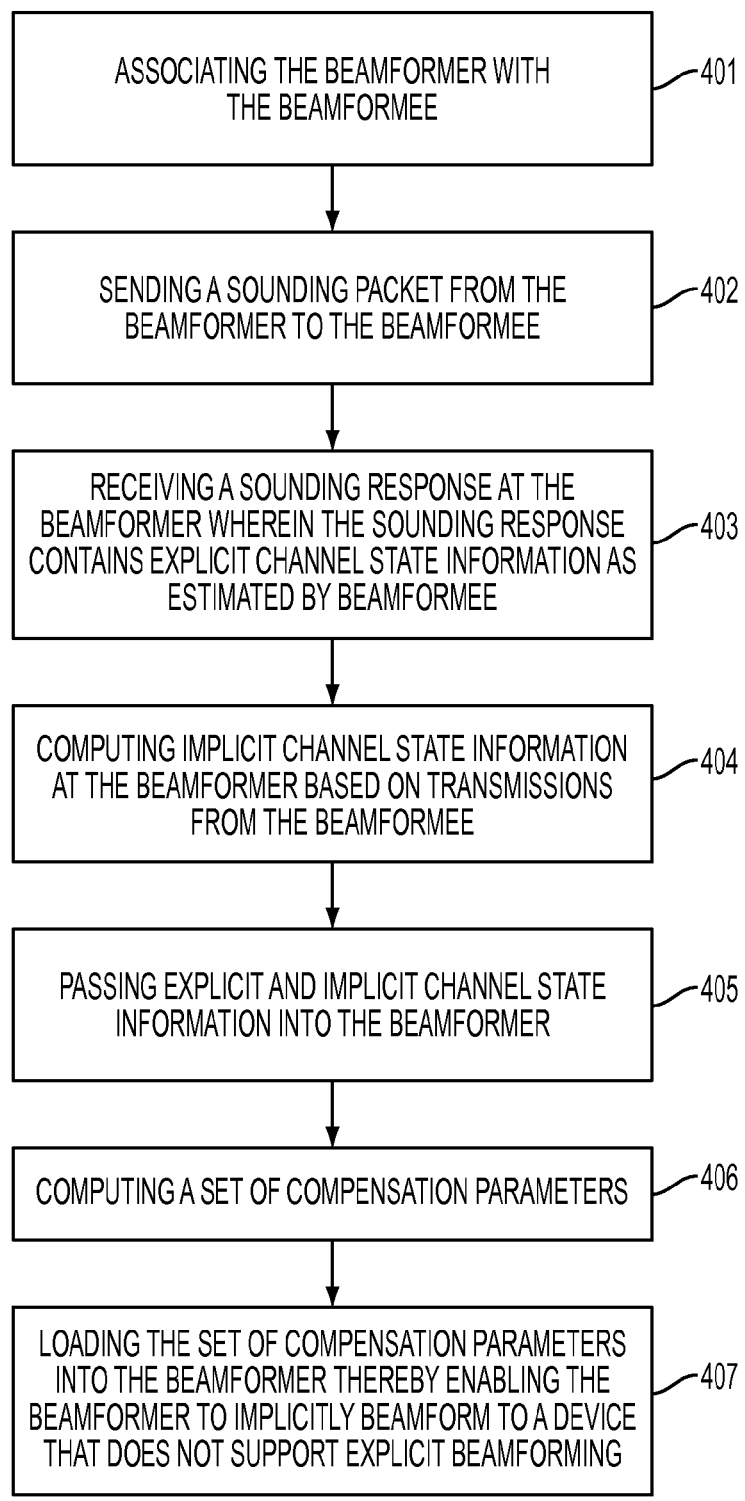
FIG. 4 shows a flowchart of a method of calibrating an implicit beamforming wireless system in accordance with an embodiment of the present invention.

For a better understanding, of the method please refer now to FIG. 4. FIG. 4 shows a flowchart of a method in accordance with an embodiment of the present invention. A first step 401 is associating the beamformer with the beamformee. Step 402 is sending a sounding packet from the beamformer to the beamformee. A next step 403 involves receiving a sounding response at the beamformer wherein the sounding response contains explicit channel state information as estimated by beamformee. Step 404 is computing implicit channel state information at the beamformer based on transmissions from the beamformee.

The next step 405 is passing explicit and implicit channel state information into the beamformer. Step 406 includes computing a set of compensation parameters. The final step 407 includes loading the set of compensation parameters into the beamformer thereby enabling the beamformer to implicitly beamform to a device that does not support explicit beamforming.

It should be noted that the explicit and implicit steering matrices will be similar because they correspond to the same channel. They won't be identical because of noise, rotational uncertainty (the steering matrices are unique to within a constant rotation) and most importantly because the transmit and receive paths are uncalibrated. Uncalibrated transmit and receive paths in the Beamformer will result in rotations of the terms in the implicit steering matrix compared to the corresponding terms in the explicit steering matrix. The calibration unit determines the set of rotation factors that correct the terms in the implicit steering matrix and then uses those rotation factors to compute the compensation parameters.

The system in accordance with the present invention can take the form of an entirely hardware implementation, an entirely software implementation, or an implementation containing both hardware and software elements. In one implementation, this detection procedure is implemented in software, which includes, but is not limited to, application software, firmware, resident software, microcode, etc.

Furthermore, the method can be implemented in the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Varying embodiments of the present invention describe a method and apparatus for calibration of an implicit beamforming wireless communication systems. In an embodiment, an explicit beamforming system is utilized to calibrate an implicit beamforming device. The invention does not employ specialized equipment or a special test environment or additional hardware. Additionally, the calibration is fairly quick and can be performed anytime during the lifetime of the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of calibrating an implicit beamforming wireless system wherein the implicit wireless system comprises a beamformer and a beamformee, the method comprising:
    associating the beamformer with the beamformee;
    sending a sounding packet from the beamformer to the beamformee;
    receiving a sounding response at the beamformer, wherein the sounding response contains explicit steering matrix information as estimated by beamformee;
    computing implicit steering matrix information at the beamformer based on transmissions from the beamformee;
    passing explicit and implicit steering matrix information into the beamformer;
    computing a set of transmit and receive compensation parameters, wherein the transmit and receive compensation parameters match an implicit steering matrix with an explicit steering matrix; and
    loading the set of transmit and receive compensation parameters into the beamformer thereby enabling the beamformer to implicitly beamform to a device that does not support explicit beamforming.

2. The method of claim 1 wherein the beamformer includes a calibration unit and passing explicit and implicit steering matrices into the beamformer further comprises passing explicit and implicit steering matrices into the calibration unit.

3. The method of claim 2 wherein the calibration unit is in a hardware or in a software layer of the beamformer.

4. The method of claim 2 wherein the calibration unit determines a set of rotation factors for use in computing the transmit and receive compensation parameters.

5. The method of claim 1 wherein the beamformee supports explicit beamforming as defined in IEEE 802.11n.

6. The method of claim 1 wherein receiving a sounding response at the beamformer wherein the sounding response contains a explicit steering matrix information further comprises:
    the beamformer computing the implicit steering matrix information based on the sounding response.

7. The method of claim 1 wherein, during implicit beamforming, the beamformer receives a normal data packet from the beamformee and uses the normal data packet to compute the implicit steering matrix based on channel state information for the received channel.

8. The method of claim 1 wherein the calibration procedure is performed multiple times during the lifetime of the device.

9. A wireless communication system comprising:
    a beamformer and a beamformee;
    a communication channel for communication there between wherein the beamformer and beamformee each include at least one software module capable of performing the following steps:
    associating the beamformer with the beamformee;
    sending a sounding packet from the beamformer to the beamformee;
    receiving a sounding response at the beamformer wherein the sounding response contains explicit steering matrix information as estimated by beamformee;
    computing implicit steering matrix information at the beamformer based on transmissions from the beamformee;
    passing explicit and implicit steering matrix information into the beamformer;
    computing a set of transmit and receive compensation parameters, wherein the transmit and receive compensation parameters match an implicit steering matrix with an explicit steering matrix; and
    loading the set of transmit and receive compensation parameters into the beamformer thereby enabling the beamformer to implicitly beamform to a device that does not support explicit beamforming.

10. The system of claim 9 wherein the beamformer includes a calibration unit and passing explicit and implicit steering matrices into the beamformer further comprises passing explicit and implicit steering matrices into the calibration unit.

11. The system of claim 10 wherein the calibration unit is in a hardware or in a software layer of the beamformer.

12. The system of claim 10 wherein the calibration unit determines a set of rotation factors for use in computing the transmit and receive compensation parameters.

13. The system of claim 9 wherein the beamformee supports explicit beamforming as defined in IEEE 802.11n.

14. The system of claim 9 wherein receiving a sounding response at the beamformer wherein the sounding response contains a explicit steering matrix information further comprises:
    the beamformer computing the implicit steering matrix information based on the sounding response.

* * * * *